Patented Jan. 9, 1951

2,537,375

UNITED STATES PATENT OFFICE 2,537,375

METHOD OF CURING POLYESTER RESINS

William G. Simons, Greenwich, and Edwin H. Dafter, Jr., Stamford, Conn., assignors to American Cyanamid Company, New York, N. Y., a corporation of Maine No Drawing. Application August 1, 1947, Serial No. 765,654

3 Claims. (Cl. 260—45.4)

This invention relates to resinous compositions capable of curing at room temperature, and products obtained therefrom. More particularly, this invention is related to polyester resins comprising a mixture of a polymerizable unsaturated alkyd resin and a copolymerizable substance having a $CH_2=C<$ group, and an organic hydroperoxide or peracid catalyst and metallic salt drier employed in conjunction therewith. Included within the scope of this invention is the process of room temperature curing polyester resins.

Polyester type resins have previously been catalyzed with organic peroxides, and commercial metallic salt driers have been employed therewith to effect thermally cured resinous compositions having a uniform cure. However, it has previously been possible to only gel these resins with the driers and organic peroxides at room temperature. According to the teachings of this invention, these resins with a particular class of organic peroxides such as hydroperoxides, and peracids, and metal salts functioning as accelerators, it is possible to obtain complete cure of these resins at room temperature.

The organic hydroperoxides and peracids satisfactory in practicing this invention, are characterized in that they have an easily oxidized hydrogen group; they have a common end grouping or radical as follows: —COOH.

According to the teachings of this invention, a copolymerizable mixture of an unsaturated alkyd resin and a substance having a $CH_2=C<$ group and a boiling point above 60° C., is blended with from about 0.001% to about 0.05% metal in the form of a metallic salt drier, such as manganese napthenate, cobalt napthenate, and the like, and from about .10 to about 5% organic hydroperoxide or peracid. The percentages are all based on the weight of copolymerizable resinous mixture. Compositions obtained in this manner will cure at a room temperature of 25° C.; however, the rate of cure is accelerated by increasing the temperature; and, by like token, the rate of cure is accelerated by the increased percent organic hydroperoxide or peracid, and the percentage should be above 0.25 for relative rapid cure. The metallic salt drier appears to function as an accelerator for the peroxide catalyst, and substantial increase in rate of cure is also obtained by increasing the proportionate amount of this material. However, since the materials have a harmful color effect on the resin, it is desirable to use as small a quantity of this material as possible. Accordingly, it is not advisable to use more than 0.004% to about 0.01% metal, unless, of course, color is not a controlling factor. As a percentage of cobalt or manganese salt is increased, the cure time is lessened, but the exothermic reaction is moderated; and, as such, a soft gel results, and, finally, with about 0.5% metal in the form of the metal salt drier, the catalyst will produce only a very soft gel within reasonable periods of time.

It is believed that the invention will be more fully understood by the following examples which are given wholly by way of illustration.

Example 1

Sixty-seven (67) parts of a propylene glycol fumarate-phthalate alkyd resin was mixed with 33 parts of monomeric styrene and stabilized with 0.01% hydroquinone by weight.

To this mixture there was added 0.3% of 1 - hydroxy cyclohexyl hydroperoxide - 1 and 0.004% cobalt in the form of cobalt napthenate. This mixture was cast and allowed to air dry overnight at 25° C. At the end of this time the cast object had a Barcol hardness of 45.

Example 2

To a mixture consisting of 67 parts of propylene glycol fumarate-phthalate alkyd resin and 33 parts of monomeric styrene, stabilized with hydroquinone, there was added 0.3% 1-hydroxy cyclohexyl hydroperoxide-1 and 0.016% cobalt in the form of cobalt napthenate; this composition was cast at 25° C. for 1½ hours. The cast article obtained in this manner had a Barcol hardness of 45.

A series of tests were conducted wherein propylene glycol fumarate-tetrachlor phthalate, diethylene glycol fumarate-phthalate, diethylene glycol sebacate-fumarate, and propylene glycol fumarate-phthalate, were admixed with styrene, in proportions varying from 1:1 to 3:1 parts by weight. These alkyds were also admixed in these proportions with diallyl esters, such as diallyl phthalate, in lieu of styrene. These compositions were catalyzed with 0.004% cobalt in the form of cobalt naphthenate and 0.4% 1-hydroxy cyclohexyl hydroperoxide-1, and the resultant compositions cured at 25° C. As a result of these experiments, it was ascertained that a styrene alkyd copolymer resin had a shorter cure time than the diallyl ester-alkyd copolymers, and that better cures were obtained when the ratio of alkyd to styrene was from 1:1 to 2:1 parts by weight.

External temperature is an important factor in determining the cure time. For example, a composition having a cure time of 8–10 hours at 25° C. was cured in about 1 hour at 40° C. Likewise, canvas laminates which were cured overnight at 25° C., were after-baked 20 minutes in an oven at 105° C., and these laminates had a Barcol hardness of 40. In preparing castings of cylindrical shape or large cross-section, however, it is advantageous to employ a low concentration of hydroperoxide catalyst, preferably below 0.5% 1-hydroxy cyclohexyl hydroperoxide-1 and at a temperature of approximately 25° C., in order to provide a long cure time; or stated differently, a slow cure. In this manner, the castings are remarkably free from strain when viewed in a polaroid analyzer.

As used in the above examples, the 1-hydroxy cyclohexyl hydroperoxide-1 was employed in the form of a paste comprising 50 parts of the hydroperoxide and 50 parts of dibutyl phthalate heated to 60° C., and stirred until complete solution occurred. The paste obtained in this manner rapidly goes into solution with the resin, whereas the hydroperoxide in solid form, requires considerable time to effect solution with the resin.

Any of the metal salt driers, standard within the practice, may be satisfactorily employed; it is preferable, however, to employ a manganese napthenate or a cobalt napthenate.

Examples of substances containing a polymerizable $CH_2=C<$ group, and a boiling point above 60° C., which may be copolymerized with an unsaturated alkyd resin in accordance with our invention are styrene, o-methyl styrene, m-methyl styrene or p-methyl styrene, the monochlor or dichlor styrenes, dimethyl styrenes, vinyl acetate, methyl methacrylate, methyl acrylate, allyl acetate, diallyl phthalate, diallyl fumarate, diallyl maleate, diallyl sebacate, diallyl succinate, triallyl phosphate, triallyl tricarballylate, the diallyl ester of ammelide, etc.

The unsaturated alkyd resins which are suitable for use in accordance with our invention are those which are polyesters of an alpha, beta-unsaturated polycarboxylic acid and a polyhydric alcohol. The unsaturated alkyd resins may be modified with monohydric alcohols or monocarboxylic acids. Proportions of the various substances esterified to form the resins are such that the polyester is formed from substances having about one hydroxyl group for each carboxyl group.

Among the alpha, beta-unsaturated polycarboxylic acids which may be used, some examples are maleic acid, fumaric acid, itaconic acid, citraconic acid, etc. Mixtures of alpha, beta-carboxylic acids may be used and mixtures of polycarboxylic acids including one or more alpha, beta-unsaturated polycarboxylic acids and a saturated aliphatic polycarboxylic acid or an aromatic polycarboxylic acid may be employed. In some cases, particularly when the unsaturated alkyd resin is to be used with copolymerization with styrene or other aromatic vinyl hydrocarbons, it is desirable that the unsaturated alkyd resin contain a small proportion of a relatively long chain polycarboxylic acid such as adipic acid or sebacic acid, or of an aromatic polycarboxylic acid such as phthalic acid or endomethylene tetrahydrophthalic anhydride. The term "acid" as used herein, is intended to cover the anhydride as well as the acid, since the anhydride may be used whenever available and desirable.

The unsaturated alkyd resins are preferably polyesters of glycols, but other polyhydric alcohols including glycerine, pentaerythritol, dipentaerythritol, polyallyl alcohol, etc., may be used. Examples of glycols which may be used are ethylene glycol, diethylene glycol, trimethylene glycol, alpha-propylene glycol, any of the butylene glycols, decamethylene glycol, octadecandiol, etc.

When glycols are reacted with a dicarboxylic acid, it is preferable that the glycol be present in a molal ratio to the acid of not less than 1:2 and the molal ratio of monohydric alcohol to dicarboxylic acid not greater than 1:1. In most cases the molal ratio of monohydric alcohol to dicarboxylic acid of about 1:5 produces the best results (5.5 mols of glycol being employed in this case). The proportion of monocarboxylic acid which may be used should similarly be less than 1:2 in most instances. If a dicarboxylic acid which does not contain an alpha, beta-unsaturation is used to modify the unsaturated alkyd resins, it is preferable that the molal ratio thereof to the alpha, beta-unsaturated polycarboxylic acid be less than about 1:2, and preferable that the ratio be about 1:5.

The unsaturated alkyd resins are produced in accordance with technique well known in the alkyd resin art. The final product should preferably have an acid number not greater than 50, although in some cases resins having an acid number as high as 100 may be desirable.

Moldings and castings produced in accordance with this invention may have suitable additives incorporated therewith, such as fillers, dyes, pigments, and the like, including for example, wood flour, glass fibers, asbestos fibers, titanium dioxide, and the like. Laminated materials may be prepared utilizing the resin catalysts herein disclosed, and may contain paper or fabric composed of cellulosic fibers, glass fibers, asbestos fibers, synthetic fibers, and the like.

Obviously, many modifications and variations may be made in the processes and methods described hereinabove, without departing from the scope and spirit of the invention defined in the appended claims.

We claim:

1. A resinous composition capable of curing in 1½ to 10 hours at room temperature, comprising a copolymerizable mixture of a polymerizable alpha, beta-unsaturated alkyd resin and a polymerizable substance having the $CH_2=C<$ group and having a boiling point above 60° C., 1-hydroxy cyclohexyl hydroperoxide-1 present in an amount from 0.10% to 5% based on the weight of copolymerizable resin, and a metal salt drier present in an amount from 0.004% to 0.01% metal based on the weight of copolymerizable resin.

2. A resinous composition capable of curing in 1½ to 10 hours at room temperature comprising an alpha, beta-unsaturated alkyd resin and styrene, 1 - hydroxy cyclohexyl hydroperoxide-1 present in an amount from 0.10% to 5% based on the weight of copolymerizable resin, and cobalt napthenate present in an amount of from 0.004% to 0.01% cobalt based on the weight of copolymerizable resin.

3. A hard, cured resinous composition comprising a polyester resin, 1-hydroxy cyclohexyl hydroperoxide-1 present in an amount from 0.10% to 5% based on the weight of copolymerizable resin, and cobalt napthenate present in an amount of from 0.004% to 0.01% cobalt based on the weight of copolymerizable resin.

WILLIAM G. SIMONS.
EDWIN H. DAFTER, Jr.

REFERENCES CITED

The following references are of record in the file of this patent:

UNITED STATES PATENTS

| Number | Name | Date |
| --- | --- | --- |
| 2,220,621 | Ellis | Nov. 5, 1940 |
| 2,409,633 | Kropa | Oct. 22, 1946 |